Figure 1:
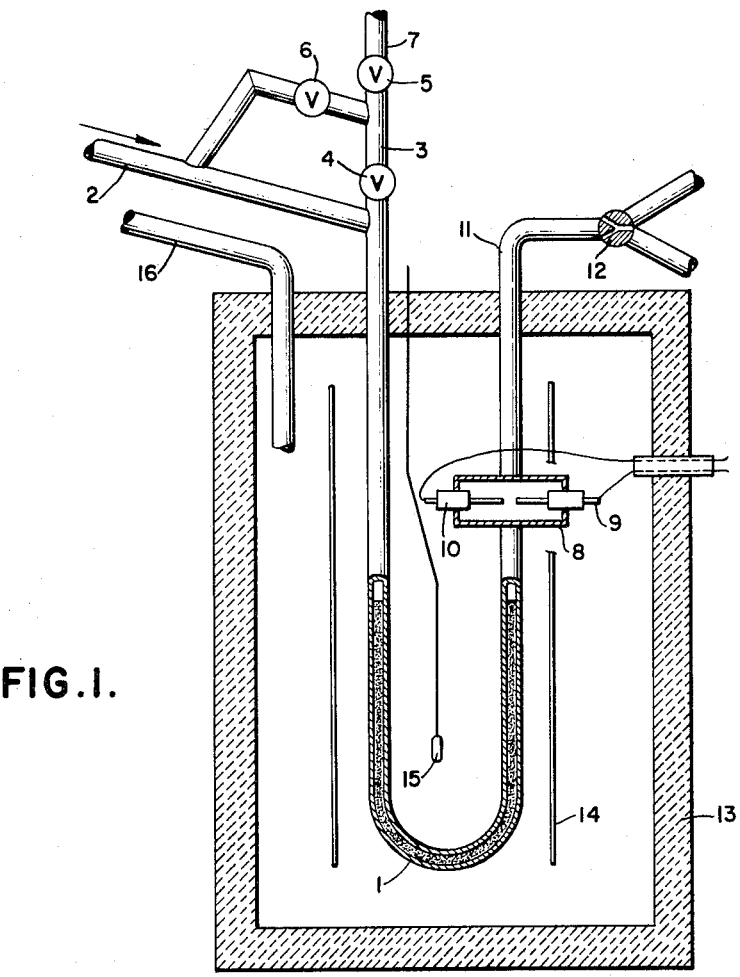

March 1, 1966     J. W. BARRETT     3,237,380
CHROMATOGRAPHY PURIFICATION PROCESS
Filed Feb. 3, 1961

INVENTOR
JACK WHEELER BARRETT
BY
ATTORNEY

United States Patent Office 3,237,380
Patented Mar. 1, 1966

3,237,380
CHROMATOGRAPHY PURIFICATION PROCESS
Jack Wheeler Barrett, Chalfont St. Giles, England, assignor to Monsanto Chemicals Limited, London, England, a British company
Filed Feb. 3, 1961, Ser. No. 86,998
Claims priority, application Great Britain, Feb. 15, 1960, 5,256/60
15 Claims. (Cl. 55—67)

This invention relates to a purification process, particularly to a process for the purification of metallic and semi-metallic substances.

Purification methods in general have been developed over a great number of years and have been applied to a wide variety of specific problems. In recent times, however, specialized techniques have become necessary, because applications have arisen in which there is a requirement for substances having an extremely high degree of purity. This is particularly so for certain substances employed in the electrical industry, for instance, the metals and semimetals used for semiconductor applications. In the semiconductor field the final product used in a semiconductor device (such as a transistor or a rectifier) does not consist solely of a single pure substance, but there is nonetheless a requirement for substances of very high purity since a semiconductor is normally produced by intentionally adding a trace of an "impurity" of a certain kind to a base substance which is itself extremely pure. The degree of purity necessary in the base substance is for instance measured in ten-thousandths of one percent and is very difficult to achieve.

A new method has, however, now been discovered which can be employed to remove an impurity from a metallic or semimetallic substance to a very complete extent, particularly an impurity that is difficult to eradicate by conventional methods of purification.

The process of the invention is in fact one for the purifying of a metallic or semimetallic substance, which comprises passing the vapor of the metallic or semimetallic substance in an impure condition through a gas chromatographic column at an elevated temperature and then isolating the purified substance.

The term vapour is used to include a vapour that is actually at a temperature above its critical temperature.

The process can, for example, comprise vaporizing a portion of the impure substance at a temperature of over 500° or 600° C., and often of at least 750° C., preferably with the aid of an inert entraining gas, passing the mixture of vapor of the substance and vapor of the impurities through a chromatographic column, which will contain an appropriate stationary phase, and isolating the vapor of the substance free from the impurities. The stationary phase can be a solid, as in adsorption chromatography, or it can be a solid packing supporting a liquid, as in partition chromatography.

The purification process of the invention is applied to metallic substances (including intermetallic componds in suitable instances) and to semi-metallic substances, that is to say, the other elements which have metallic properties in some respects; the substances are, of course, ones that either boil or have an appreciable vapor pressure at practical operating temperatures. Specific examples of metallic and semimetallic substances from which impurities can be effectively removed by the process of the invention are lithium, sodium, potassium, silver, copper, beryllium, magnesium, calcium, strontium, barium, zinc, cadmium, mercury, aluminum, gallium, indium, thallium, silicon, germanium, tin, lead, arsenic, antimony, bismuth, selenium, tellurium, manganese, palladium and cerium. The metallic or semimetallic substance to be purified is usually one that is solid at an ordinary atmospheric temperature, that is to say, solid at 20° C.

The process is particularly valuable in the purification of substances that can be employed in the production of semiconductor devices. In this purification it is necessary to insure the absence of traces of impurities such as, for example, zinc, copper and lead, and the process of the invention is well suited for doing this. In general, there is more than one impurity to be removed, although one or any number can be removed in appropriate circumstances. In the field of semiconductors important substances are silicon and germanium; the III–V materials such as, for instance, the arsenides of gallium and of indium, the antimonides of indium and of aluminum, and the phosphides of gallium, of indium and of boron; and also cadmium selenide, bismuth telluride, cadmium sulphide, bismuth antimony telluride, silver antimony telluride, mercury telluride, and mercury cadmium telluride. Many of the components of these materials are capable of purification by the process of the invention. Normally they would be purified separately; for instance a stream of pure gallium or indium vapor after isolation from the impurities can be passed into an atmosphere of arsenic vapor to react to give the appropriate arsenide.

The temperature at which the chromatographic column is operated is normally within the range of 500° to 3000° C. (although in certain instances it can be outside these limits). In many instances the temperature is at least 700° or 750° C., and is often over 1000° C. A very useful range if from 1000° to 2500° C. Within this range, for example, somewhere between 1000° and 2000° C., and particularly in the vicinity of 1500° C., there can be purified many of the substances referred to above. The temperatures can be measured by conventional means, for instance, a thermocouple, such as an iridium-platinum or rhenium-tungsten thermocouple, a carbon thermocouple, or an optical pyrometer.

The chromatographic column needs of course to be specifically designed for the high temperature employed, and this also has to be taken into account in choosing the stationary phase. Materials from which the column can be constructed are stainless steel, carbon, zirconium oxide, rhenium, tantalum, tungsten, silicon carbide, molybdenum, niobium, ruthenium and iridium. In practice stainless steel, carbon or tantalum is convenient, although with the last two materials the column needs to be operated in an atmosphere that does not contain oxygen. In general, when working in the higher temperature ranges it is preferable that oxygen is excluded whatever the material of construction.

The stationary phase is preferably often a liquid (at the temperature of operation) supported on a suitable packing. A choice can be made for the liquid from a range of suitable metals, for example, tin, iron, nickel, cobalt, chromium, hafnium, platinum, rhodium, thorium, titanium, vanadium and zirconium. Tin, iron, nickel and cobalt are sometimes particularly useful. The chosen metal can, for instance, be deposited on the solid packing by chemical means. A certain quantity of the vapor of the liquid, such as one of the metals specified, will pass through the column and condense with the metallic or semimetallic substance that is being purified of other components by the procss of the invention. This quantity of the liquid stationary phase then needs to be removed by conventional means. This factor (that is to say, the requirement that it can be removed conveniently from the final product) should be taken into account in selecting a liquid phase in any particular instance. The packing for the liquid can, for example, be magnesia or silicon carbide; alternatively it can, for example, comprise one of the materials referred to above as suitable for construction of the column. As a packing preferably the material is in a form having a large surface area, for instance in foamed or sintered form. Where the stationary phase is a solid as in adsorption chromatography, this also should be in a form having a large surface area; suitable materials are, for instance, silicon carbide, alumina or a silica aerogel.

In practice a gas that is inert under the operating conditions is used as an entraining gas to elute the substance from the column, and an effective gas for this purpose is argon. Other truly inert gases can, however, be employed, for instance helium. Gases that can be employed where the circumstances are such that they are inert are nitrogen and hydrogen.

The chromatographic column and contents can be heated to the necessary temperature in a variety of ways, one of the most effective being by radiation from a heated source, for example, electrically heated silicon carbide or tungsten carbide rods. Preferably the whole system is then contained in a lagged chamber or possibly in a vacuum jacket. The column can also be heated in a straightforward manner by means of an electrical winding wrapped round it and made of, for instance, tantalum or tungsten wire. A third method of heating is induction heating, and this is convenient in certain circumstances; for instance, when carbon is employed for the construction of the column an induction heating system can readily be arranged by means of a suitable coil encircling the column. Yet another method is to employ resistance heating. Whatever the heating system there is preferably an external layer of insulation, for instance of graphite, magnesia, foamed silicon carbide, or vermiculite firebrick. Alternatively, there can be employed an enveloping heat reflector, made for example from sheet zirconium.

In normal operation the process is carried out on a unit portion of the impure substance, and accordingly there will issue from the column consecutive streams of vapor of the different components (including the purified substance itself) of the impure substance. Sometimes, for instance, the vapor of one or more impurities will appear first, followed by the main flow of the purified substance. A system is provided for detecting when a component leaving the column gives place to a different component, so that the vapor of the purified substance can be led into a suitable receiver to isolate it, after which it can for example be condensed and collected. If desired, each impurity can also be collected separately. Conventional valves constructed of suitable materials can be employed to switch the different vapor streams into separate receivers; alternatively, for instance, the vapor can be caused to flow into one particular outlet rather than another one by establishing an appropriate pressure gradient in the vapor stream.

Semicontinuous operation can be arranged by a system (which can be automatic) for injecting a fresh portion of the impure substance into the column as soon as the previous portion has passed through and been separated. Automatic or semiautomatic control of the switching valves is desirable in order to allow the required product to accumulate in one receiver and the impurities in another.

In certain instances it is practical for the process to operate under truly continuous conditions, for example, by continuously injecting a stream of the subsance to be purified into a column having a suitable liquid phase supported on a packing, and arranging for the liquid phase to move downwards through the column, the liquid being continuously withdrawn at the bottom and fresh material being added at the top. In the case of adorption chromatography the solid adsorbent can be moved through the column to achieve separation.

The detection of the vapors of the various components can be carried out in several ways, including the use of ionization of a component. In this instance, owing to the elevated temperatures involved, there is often sufficient ionization present to allow the measurement of an ionization current that is proportional to the concentration of the particular component leaving the column. Such a measurement can be made, for instance, using an electrode or electrodes linked to an electrometer. If, however, there is insufficient ionization in any particular instance, then the vapor stream can be subjected to an $\alpha$-ray source or an electron beam in order to produce enough ionization to operate a detecting device. Other possibilities for detection include the measurement of changes in dielectric constant and the use of methods based on X-ray absorption. In general, the detector does not of course measure the purity of the substance in question, as the content of impurity is too low to be meausred by such means; it merely indicates when the required substance and the other components are leaving the column.

Usually it is desirable to purify the substance by available conventional methods before subjecting it to the process of the invention. The impurities removed by the process of the invention are then those that are difficult to remove by other means. Thus a typical starting material might have a purity of 95% or even 99% or more. However, if desired the process need not be applied to such materials, and the required substance can be present in a much lower proportion and even in a minor proportion.

The following detailed description is now given of the way that the process is operated to produce a pure metallic or semimetallic substance.

The first example is of the production of high purity cadmium from a mixture of cadmium with mercury.

The gas chromatographic column and some of its associated equipment are shown in the accompanying drawing, FIGURE 1. The column 1 is made of stainless steel tubing with an external diameter of $\frac{3}{16}$ inch and a wall thickness of 0.05 inch. It is U-shaped with a distance between the parallel sides of 5 inches, and it is packed with silicon carbide powder to a total length of 4 feet. The silicon carbide is a porous grade (coarser than 60 British standard mesh), that is produced by agglomeration of a powdered silicon carbine of 200 mesh. The inlet end 2 of the column is connected to a source of argon under pressure (not shown); also at the inlet end is a device for injection of a sample of the substance to be purified. This consists of a chamber 3, again of stainless steel construction, fitted with valves 4 and 5 and connected to the argon supply through the valve 6. The valve 5 connects to the atmosphere at 7.

The outlet side of the column is connected to a detector 8, which consists of a stainless steel cylindrical vessel of diameter 1 inch and length 2 inches, at each end of which there is a stainless steel electrode 9 of diameter 0.1 inch, insulated from the vessel by a plug of silicon nitride 10. The tips of the two electrodes face each other and are 2 mm. apart. The electrode on one side is connected to a positive direct current potential of 700 volts, the vessel itself is earthed, and the other electrode is connected to the grid of an electrometer amplifier (not shown) connected to a potentiometric recorder that gives a reading in millivolts.

The outlet tube 11, which carries an electric heating winding and lagging (not shown), is connected to a stainless steel 3-way valve 12, each outlet of the valve being connected to a separate stainless steel condensation chamber.

The column and the detector are mounted in a chamber 13 that has an internal cross-section of 14 inches x 14 inches and an internal height of 3 feet, and that is lagged with a double layer of vermiculite refractory bricks (each 2 inches thick). The bricks are capable of withstanding a temperature of at least 1800° C. Arranged vertically round the column are tubular silicon carbide "Globar" heaters 14, having a total available output of 15 kilowatts. The chamber is also fitted with a thermocouple 15 and an argon entry tube 16.

In the production of pure cadmium from cadmium contaminated with mercury (5% by weight), a 2 milligram sample of the solid material is placed in the open end 7 of the column. With the argon supply connected and valves 4 and 6 slightly open, to flush air out of the chamber 3, the valve 5 is opened to permit the sample to pass into the chamber 3. Valve 5 is then shut and valve 6 opened fully.

By adjustment of the heaters 14, the column is heated to 800° C. The lines leading to the valve 12 and from that valve to the condensation chambers are also heated to 800° C. to prevent condensation where it is not wanted. The argon, the entraining gas, is passed into the column inlet 2 at a slow rate (10 cc. per minute), and then by opening the valve 4 the sample is allowed to drop into the top of the column. It is volatilized and the vapors pass through the column.

At the temperature of operation both cadmium and mercury vapor are sufficiently ionized on leaving the column to operate the detector, and when the readings on the recorder change to show that one component has passed through the column the valve 12 is operated to isolate that component in one of the condensation chambers where it precipitates as the pure substance.

In the production of high purity zinc from a sample contaminated with 1% by weight of cadmium, the procedure described above is followed except that the Globar heaters are controlled such that the column is operated at a temperature of 1000° C. Moreover, because of the higher temperature that is necessary the product lines and the 3-way valve 12 are installed within the chamber 13; this is a more convenient way of heating them. Argon is passed into the chamber 13 through the tube 16 at such a rate that an argon atmosphere of about 1 pound per square inch above atmospheric pressure is maintained despite the fact that there is a slow leakage of argon at the various points through which components such as the column 1 pass through the walls of the chamber.

In the production of high purity indium from a sample containing about 0.5% by weight of impurities a similar procedure is employed. In this instance, however, a different material of construction is needed for the column and the detector (including the electrodes), and they are made from tantalum. The operating temperature is in fact 1500° C., and again an argon atmosphere is maintained in the chamber.

Figure 2:
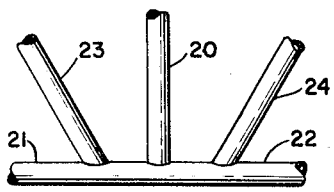

Another change made is in the design of the outlet valve 12, since stainless steel is no longer a suitable material of construction. In its place a device of the type shown in FIGURE 2 is employed. The vapors from the column enter through the tube (20); the outlets 21 and 22 lead to separate condensation chambers, and each outlet contains an inclined arm 23 and 24, down each of which a stream of argon can be passed as desired. Where for instance the condensation chamber connected to outlet 22 is to be employed, then a slow stream of argon is passed down the arm 23 but not down the arm 24. Thus the vapor stream from the column is diverted into the outlet 22.

The apparatus described above is of course a small one and it can be made on a larger scale. There are also many modifications that can be made to it. The column diameter can be increased, for instance two or three times, with a consequent increase in available throughput. In a larger capacity system some form of vaporizer is desirable in order to volatilize the impure substance before it enters the column. The vaporizer can, for instance, be a separate heated chamber containing an inert packing. At higher throughputs a more elaborate collecting system may also be necessary; for instance a simple condensation chamber can desirably be cooled to a relatively low temperature to obtain a good rate of recovery from the vapor phase. Alternatively, for instance, a different method of collection can be employed, such as by use of an electrostatic precipitator. Moreover, a substance such as for instance, indium or gallium, can be collected as indium or gallium arsenide respectively by allowing the vapor of the pure substance to come into contact with a rod of indium or gallium arsenide surrounded by an atmosphere of arsenic vapor. There is not usually an advantage to be obtained in doing so but a column can, if desired, be operated under reduced pressure.

What is claimed is:

1. A process for purifying a metallic or semimetallic substance, which comprises passing the vapor of the metallic or semimetallic substance in an impure condition and at a temperature above 750° C. through a gas chromatographic column and then isolating the purified substance.

2. A process for purifying a metallic or semimetallic substance that is solid at atmospheric temperature, which comprises passing the vapor of the metallic or semimetallic substance in an impure condition and at a temperature above 750° C. through a gas chromatographic column and then isolating the purified substance.

3. A process for purifying a metallic or semimetallic substance according to claim 2, in which the temperature is above 1000° C.

4. A process for purifying a metallic or semimetallic substance according to claim 2, in which the gas chromatographic column has a stationary phase that is a solid adsorbent.

5. A process for purifying a metallic or semimetallic substance according to claim 2, in which the gas chromatographic column has a stationary phase that is a liquid metal supported on a solid packing.

6. A process for purifying a metallic or semimetallic substance according to claim 2, in which the impure substance is volatilized with the aid of an inert entraining gas.

7. A process for purifying a metallic or semimetallic substance, which comprises passing the vapor of the metallic or semimetallic substance in an impure condition through a gas chromatographic column at a temperature of at least 750° C. and then isolating the purified substance.

8. A process according to claim 7 wherein said substance which is passed through said gas chromatographic column is, when in pure crystalline form, a semiconductor material.

9. A process for purifying a substance according to claim 7 in which the vapor of the substance in an impure condition is passed through the gas chromatographic column at a temperature above 1000° C.

10. A process for purifying a substance according to claim 7 in which the vapor of the substance in an impure condition is passed through the gas chromatographic column at a temperature in the range of 1000° C. to 2000° C.

11. A process according to claim 7 for the purification of a material selected from the group consisting of silver, aluminum, silicon, germanium, antimony, bismuth, tellurium, gallium and indium.

12. A process according to claim 7 in which an inert entraining gas is employed and the gas chromatographic column has a stationary phase that is a solid adsorbent.

13. A process according to claim 12 in which the solid adsorbent is a member selected from the group consisting of silicon carbide, alumina and silica aerogels.

14. A process according to claim 7 in which an inert entraining gas is employed and the gas chromatographic column has a stationary phase that is a liquid supported on a solid packing.

15. A process according to claim 14 in which the liquid is a member selected from the group consisting of iron, nickel and cobalt.

(References on following page)

References Cited by the Examiner

UNITED STATES PATENTS

| | | | |
|---|---|---|---|
| 1,535,157 | 4/1925 | Hughes et al. | 183—4 |
| 2,465,229 | 3/1949 | Hipple | 183—4 |
| 2,835,343 | 5/1958 | Wolff et al. | 183—114.2 |
| 3,048,029 | 8/1962 | Juvet et al. | 55—67 X |

OTHER REFERENCES

De Boer, F. E.: Purification of Metals by Gas Chromatography, in Nature, 185 (4717), 915, March 26, 1960.

REUBEN FRIEDMAN, *Primary Examiner.*

WESLEY S. COLE, *Examiner.*